US009843947B2

(12) United States Patent
Loverich et al.

(10) Patent No.: US 9,843,947 B2
(45) Date of Patent: Dec. 12, 2017

(54) VISUAL SIGNAL STRENGTH INDICATION FOR A WIRELESS DEVICE

(71) Applicant: KCF TECHNOLOGIES, INC., State College, PA (US)

(72) Inventors: Jacob Joseph Loverich, State College, PA (US); David R. Kraige, State College, PA (US); Stephen J. Wenner, Port Matilda, PA (US); Scott David Brown, Rollinsford, NH (US); Richard T. Geiger, Eugene, OR (US)

(73) Assignee: KCF Technologies, Inc., State College, PA (US)

( * ) Notice: Subject to any disclaimer, the term of this patent is extended or adjusted under 35 U.S.C. 154(b) by 0 days.

(21) Appl. No.: 14/596,755

(22) Filed: Jan. 14, 2015

(65) Prior Publication Data

US 2016/0205568 A1 Jul. 14, 2016

(51) Int. Cl.
  *H04W 52/02* (2009.01)
  *H04B 17/23* (2015.01)
  *H04B 17/318* (2015.01)
  *H04W 24/08* (2009.01)
  *H04W 24/10* (2009.01)

(52) U.S. Cl.
  CPC .......... *H04W 24/08* (2013.01); *H04B 17/23* (2015.01); *H04B 17/318* (2015.01); *H04W 52/0241* (2013.01); *H04W 52/0245* (2013.01); *H04W 24/10* (2013.01); *Y02B 60/50* (2013.01)

(58) Field of Classification Search
  CPC ............ H04W 24/08; H04W 52/0245; H04W 52/0241; H04W 24/10; H04B 17/318; H04B 17/23; Y02B 60/50
  See application file for complete search history.

(56) References Cited

U.S. PATENT DOCUMENTS

| 5,010,553 | A | 4/1991 | Scheller et al. |
| 5,193,216 | A | 3/1993 | Davis |
| 5,668,562 | A | 9/1997 | Cutrer et al. |
| 6,952,571 | B1 * | 10/2005 | Garrabrant ............ H04W 48/16 455/226.2 |
| 7,092,688 | B2 | 8/2006 | Lee et al. |
| 7,546,094 | B2 | 6/2009 | Couper |
| 8,644,771 | B1 * | 2/2014 | Delker .................. H04W 52/48 370/318 |

(Continued)

*Primary Examiner* — Omar Ghowrwal
(74) *Attorney, Agent, or Firm* — Oliff PLC

(57) ABSTRACT

A wireless edge device is operable in a wireless network and configured to communicate with other wireless devices in the wireless network. The wireless edge device includes a processor configured to receive an input to switch from a low power consumption normal operation mode to a site survey mode, a transceiver configured to (i) transmit data packets periodically or asynchronously to a wireless device of the wireless network, and (ii) receive the data packets returned by the wireless device, and a visual indicator. The processor is further configured to evaluate quality and/or reliability of the received data packets, to provide a signal to the visual indicator indicative of signal strength at the wireless edge device based on the evaluation of quality and/or reliability of the received data packets, and to switch from the site survey mode to the low power consumption normal operation mode after a predetermined time.

16 Claims, 4 Drawing Sheets

(56) References Cited

U.S. PATENT DOCUMENTS

| | | | | |
|---|---|---|---|---|
| 2009/0077283 A1* | 3/2009 | Grushkevich | ......... | G06F 3/0231 710/72 |
| 2010/0135178 A1* | 6/2010 | Aggarwal | ............. | G01S 5/0205 370/252 |
| 2012/0282889 A1* | 11/2012 | Tanaka | ................. | H04J 11/0053 455/405 |
| 2013/0149970 A1* | 6/2013 | Durick | .................. | H04W 24/02 455/67.11 |

* cited by examiner

VISUAL SIGNAL STRENGTH INDICATION FOR A WIRELESS DEVICE

TECHNICAL FIELD

This disclosure is directed to visual signal strength indication for wireless devices and, more particularly, to visual signal strength indication for low power wireless devices of a wireless network.

BACKGROUND

Some conventional methods for determining if a wireless device is within range of a receiver or data aggregator are limited to relatively high power consumption edge devices and are not concerned with the limitation of high power consumption visual displays that would be used to display the wireless connectivity. Other conventional methods use a light emitting diode for signal strength indication, but are specific to devices using PCMCIA interfaces or implementing signal strength indication at repeaters rather than edge devices. These methods do not address wireless edge devices, which have special considerations due to low power consumption requirements.

Further, conventional techniques for signal strength indication are not dynamic and tailored for installation or network setup or are specific to a setup using other signal analyzer hardware. For example, one conventional method places test antennas in a building and then, using the measurements from the test antennas, creates an optimized network of fixed antennas established at indicated locations within the building.

Because of cost and power consumption limitations, low power wireless edge devices or sensor nodes do not have user interfaces such as LCD screens for providing wireless signal strength indication. Therefore, such edge devices do not communicate signal strength to a user directly at the device. Rather, signal strength is indicated at a reception or data aggregation point where a user interface or computer can easily be used to display signal strength. Although this approach may be useful for monitoring a network over time, this approach is not suited for deploying or installing a network of edge devices or rearranging such a network. This is because in low power networks the wireless reception is not always guaranteed or known prior to setup, and some level of experimentation in positioning of the wireless edge device and or its antenna is required. This problem is particularly relevant in large scale wireless networks because the wireless edge devices are generally far from the data aggregation or user interface points. In this case, the sensor position and signal strength are not evaluated by the same person, which then requires remote communication between two technicians. This may lead to inefficient, inaccurate, and incorrect setups.

It may be desirable to enable a user controlling a position of a wireless device in a wireless network to evaluate wireless signal quality at the device in real-time while the user is moving in a facility. This disclosure describes a method of using a visual indicator, includes LEDs, to show the near real-time status of the wireless signal quality at the device.

SUMMARY

According to various aspects of the disclosure, a wireless edge device is operable in a wireless network and configured to communicate with other wireless devices in the wireless network. The wireless edge device includes a processor configured to receive an input to switch from a low power consumption normal operation mode to a site survey mode, a transceiver configured to (i) transmit data packets periodically or asynchronously to a wireless device of the wireless network, and (ii) receive the data packets returned by the wireless device, and a visual indicator. The processor is further configured to evaluate quality and/or reliability of the received data packets, to provide a signal to the visual indicator indicative of signal strength at the wireless edge device based on the evaluation of quality and/or reliability of the received data packets, and to switch from the site survey mode to the low power consumption normal operation mode after a predetermined time.

In accordance with aspect of the disclosure, a method of visually indicating signal strength at a wireless edge device of a wireless network includes receiving, via a processing unit, an input to switch from a low power consumption normal operation mode to a site survey mode; sending, via a transceiver, data packets periodically or asynchronously to a wireless device of the wireless network; and receiving, via the transceiver, the data packets returned by the wireless device. The method further includes evaluating, via the processing unit, quality and/or reliability of the received data packets; providing a visual indication of signal strength at the wireless edge device based on the evaluation of quality and/or reliability of the received data packets; and switching, via the processing unit, from the site survey mode to the low power consumption normal operation mode after a predetermined time.

DETAILED DESCRIPTION OF THE EMBODIMENTS

Figure 1:
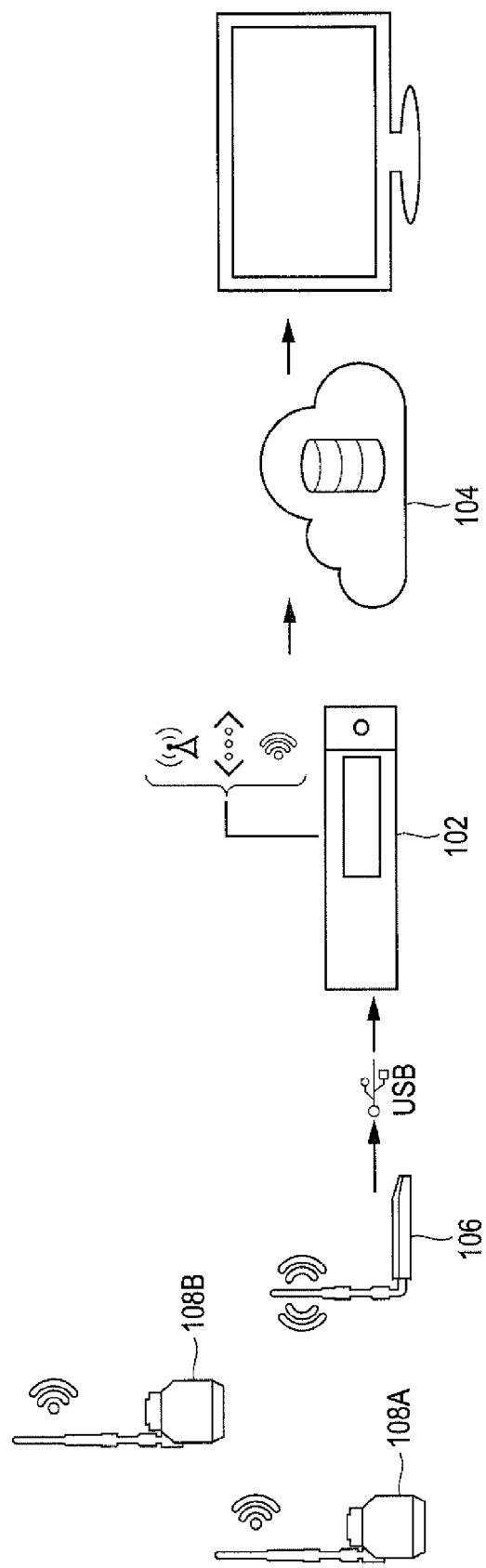
FIG. 1 illustrates an example of a wireless network and its components according to various aspects of the disclosure.

FIG. 1 illustrates an example of a wireless network 100, for example, an RF network, according to various aspects of the disclosure. The wireless network 100 includes one or more wireless edge devices, such as wireless edge devices 108(a), 108(b) (collectively referred to as wireless edge devices 108), a base station 106, and a collection server 102. In some implementations, the collection server 102 may be connected to cloud storage 104.

The wireless edge devices 108 are spatially distributed throughout the network 100. The wireless edge devices 108 in the wireless network 100 may be any type of network node or communication node. For example, the one or more wireless edge devices 108(a), 108(b) may be configured to receive input signals, or to provide output signals, or both. For example, the wireless edge devices 108(a), 108(b) may include sensors, control nodes, and/or visual indicators. Examples of sensors include vibration sensors, light sensors, and temperature sensors. A control node is a device configured to output a signal to, for example, shut down a machine remotely. A visual indicator may comprise an LED of a low power display. The input signals and/or the output signals may include instructions for operation of the wireless edge devices and/or device data. The instructions may include, for example, state machines describing wireless edge device states and triggers for the wireless edge devices.

It should be appreciated that the wireless edge devices 108(*a*), 108(*b*) can be any device in communication with the wireless network 100. For example, a wireless edge device can be a terminal point in the network 100 where the wireless communication is linked to an external interface located at the edge device. The external interface may be a transducer that converts a measurable physical characteristic/parameter such a temperature, vibration, light, or the like into an electrical signal (e.g., a digital message) that can be communicated over the wireless network 100. Additionally or alternatively, the external interface may be a transducer that converts a digital wirelessly-communicated message into an electrical output signal and/or a visual display. In some aspects, the wireless edge device may be a point in the network 100 where digital messages are communicated bi-directionally to another wireless communication device or a device that is hardwired to a network.

Figure 2:
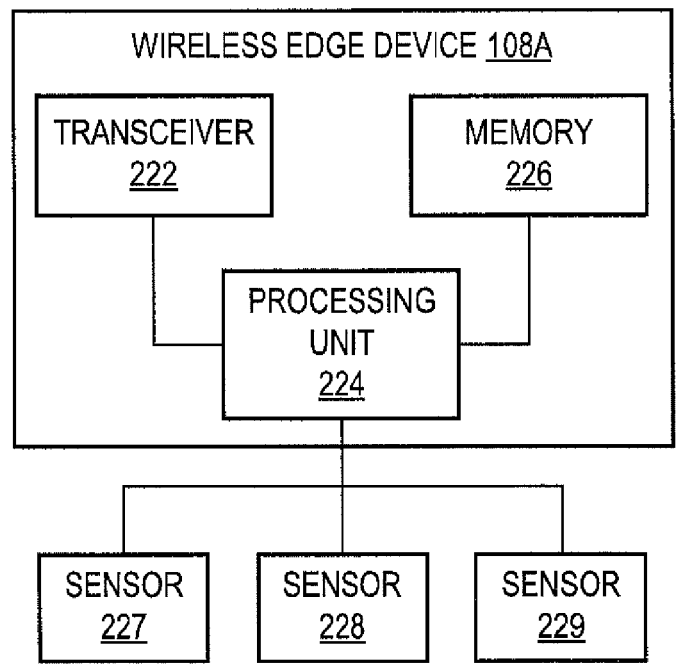
FIG. 2 illustrates an example of a wireless edge device according to various aspects of the disclosure.

Each of the one or more wireless edge devices 108 is a processing device that includes, as shown in FIG. 2, a transceiver 222 for receiving and/or sending signals, for example, a wireless network interface. Each of the wireless edge devices 108 also includes a processing unit 224 for processing instructions and/or data. The processing unit 224 may be a microprocessor or microcontroller, a field-programmable gate array (FPGA), a digital signal processor (DSP), or some other suitable unit that is capable of processing instructions and/or data. Each of the wireless edge devices 108 also includes memory 226 for storage of the instructions and/or data. The memory 226 may be one of a hard disk, flash memory, read-only memory (ROM), random access memory (RAM), or some suitable combination of these, or some other memory that is capable of storing instructions and/or data.

One or more of the wireless edge devices 108 may include one or more sensors for sensing data, e.g., those associated with the monitored machines. For example, as shown in FIG. 2, a wireless edge device 108(*a*) may include one or more sensors 227, 228, 229. In some implementations, the one or more sensors included in the wireless edge devices 108 may include sensors such as accelerometers, gyroscopes, magnetometers, strain gauges, load cells, temperature sensors, pressure sensors, or any other suitable sensor.

Each of the wireless edge devices 108 includes a visual indicator 110, for example, one or more light emitting diodes (LEDs), to show the near real-time status of the communication link between a respective wireless edge device and another node of the wireless network 100. Characteristics of an LED, such as flash rate, duty cycle, brightness, color, or any combination of these characteristics, can be used to indicate the signal quality at a wireless edge device. The control of the LED characteristics of the visual indicator may be based on evaluating either the strength of an incoming radio frequency (RF) signal or by monitoring the success rate of packets sent from the respective wireless edge device to a data aggregation point. One exemplary physical embodiment of the visual indicator 110 is one or more LEDs on a circuit board located in a housing 114 of each of the wireless edge devices 108. The housing material may have an opening(s) and/or translucent properties that allow the one or more LEDs to be viewed from the exterior of the housing 114.

In some implementations, each of the wireless edge devices 108 may implement a state machine (not shown) that describes the operation of the wireless edge device. Using such state machine implementations of wireless edge devices, the wireless network 100 can be used for structuring and deploying reconfigurable wireless edge device behavior in an industrial wireless network. For example, the one or more wireless edge devices 108 may be placed within one or more machines involved in an industrial process. The wireless edge devices may be connected to one or more electrical or mechanical components of the machines involved in the industrial process. A state machine model may be used for the wireless edge devices 108 to monitor the operational status of one or more machines involved in the industrial process by monitoring and collecting, by each wireless edge device, data corresponding to the operation of the machine associated with the respective wireless edge device.

Each of the one or more wireless edge devices 108 may communicate with the base station 106. A wireless edge device may communicate with a base station over a communications channel. In some implementations, the communications channel includes the wireless RF channel 112. The one or more wireless edge devices 108 may communicate collected data to one of the base stations via the RF channel 112. In other implementations, a different communications channel may be used, which may be a wired or wireless communications channel.

The RF channel 112 may be part of a local area network (LAN), or a wide area network, e.g., the Internet. The network may include one or more wireless RF channels, which are used by the wireless edge devices to communicate with the base station 106. Each RF channel 112 may operate at a different frequency and data rate, or all or some of the RF channels may operate at the same frequency and data rate. Each RF channel may have the same bandwidth and be capable of supporting similar data rates, or the RF channels may have different bandwidths and support different data rates. In some implementations, the number of RF channels included in the network may be the same as or greater than the number of wireless edge devices in the wireless device network, such that each wireless edge device is able to transmit using a different RF channel. However, in other implementations, the number of RF channels may be less than the number of wireless edge devices, such that at least some of the wireless edge devices 108 share some of the RF channels for transmission.

Figure 3:
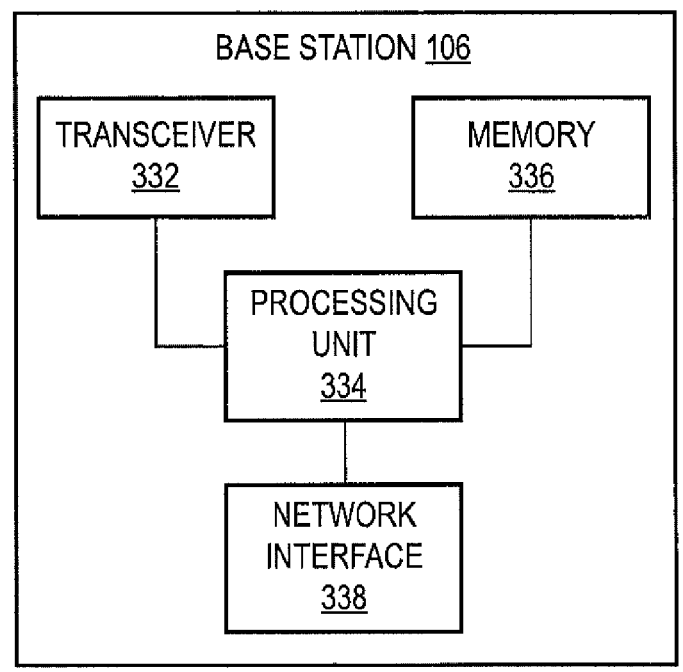
FIG. 3 illustrates an example of a base station according to various aspects of the disclosure.

The base station 106 acts as a gateway between the collection server 102 and the one or more wireless edge devices 108. The base station 106 is a processing device that includes, as shown in FIG. 3, a transceiver 332 for receiving and/or sending communication signals. In some implementations, the transceiver 332 may be a wireless network interface, while in other implementations the transceiver 332 may be a wired network interface. The base station 106 also includes a processing unit 334 for processing instructions and/or data. The processing unit 334 may be a microprocessor or microcontroller, a field-programmable gate array (FPGA), a digital signal processor (DSP), or some other suitable unit that is capable of processing instructions and/or data. The base station 106 further includes memory 336 for storage of the instructions and/or data. The memory 336 may be one of a hard disk, flash memory, read-only memory (ROM), random access memory (RAM), or some suitable combination of these, or some other memory that is capable of storing instructions and/or data. In addition, the base station 106 includes one or more network interfaces 338 to communicate with the wireless edge devices 108 or collection server 102, or both. In some implementations, the network interface 338 may be combined with the transceiver 332 as a single network component.

The base station 106 may be configured to facilitate bi-directional communication to some or all of the one or more wireless edge devices 108. For example, as illustrated in FIG. 1, base station 106 may be in communication with wireless edge devices 108(a) and 108(b). The base station 106 may send instructions, including state machines, to the wireless edge devices 108 and receive collected data from the wireless edge devices. In some implementations, the one or more base stations 106 communicate the data to the collection server 102 immediately upon receipt received from the one or more wireless edge devices. In other implementations, the base stations 106 communicate the data to the collection server 102 on a fixed time schedule.

The collection server 102 may include one or more servers that process sensor data collected by the wireless edge devices 108, and forwarded to the collection server 102 by the base stations 106. Additionally or alternatively, the collection server 102 may send instructions to the wireless edge devices 108 for collecting data.

Figure 4:
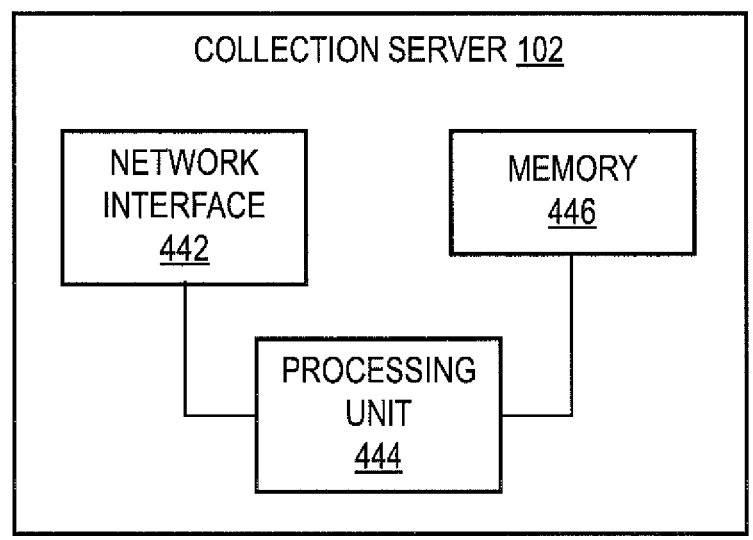
FIG. 4 illustrates an example of a collection server according to various aspects of the disclosure.

As shown in FIG. 4, collection server 102 includes a network interface 442 through which the server 102 is connected to the base station 106, which in turn communicate with the sensor nodes 108. In some implementations, the collection server 102 may include a plurality of network interfaces 442. In some implementations, the network interface 442 may be a wireless network interface, while in other implementations the network interface 442 may be a wired network interface. The collection server 102 also includes a processing unit 444 for processing instructions and/or data. The processing unit 444 may be a microprocessor or microcontroller, a field-programmable gate array (FPGA), a digital signal processor (DSP), or some other suitable unit that is capable of processing instructions and/or data. The instructions and/or data processed by the collection server 102 may be stored in memory 446, which may be one of a hard disk, flash memory, read-only memory (ROM), random access memory (RAM), or some suitable combination of these, or some other memory that is capable of storing instructions and/or data. In some implementations, the collection server 102 may be configured to store sensor data in the cloud storage 104, or retrieve sensor data from the cloud storage 104, or both. The collection server 102 may communicate with the cloud storage 104 via one or more network connections, e.g, established using the network interface 442.

Figure 5:
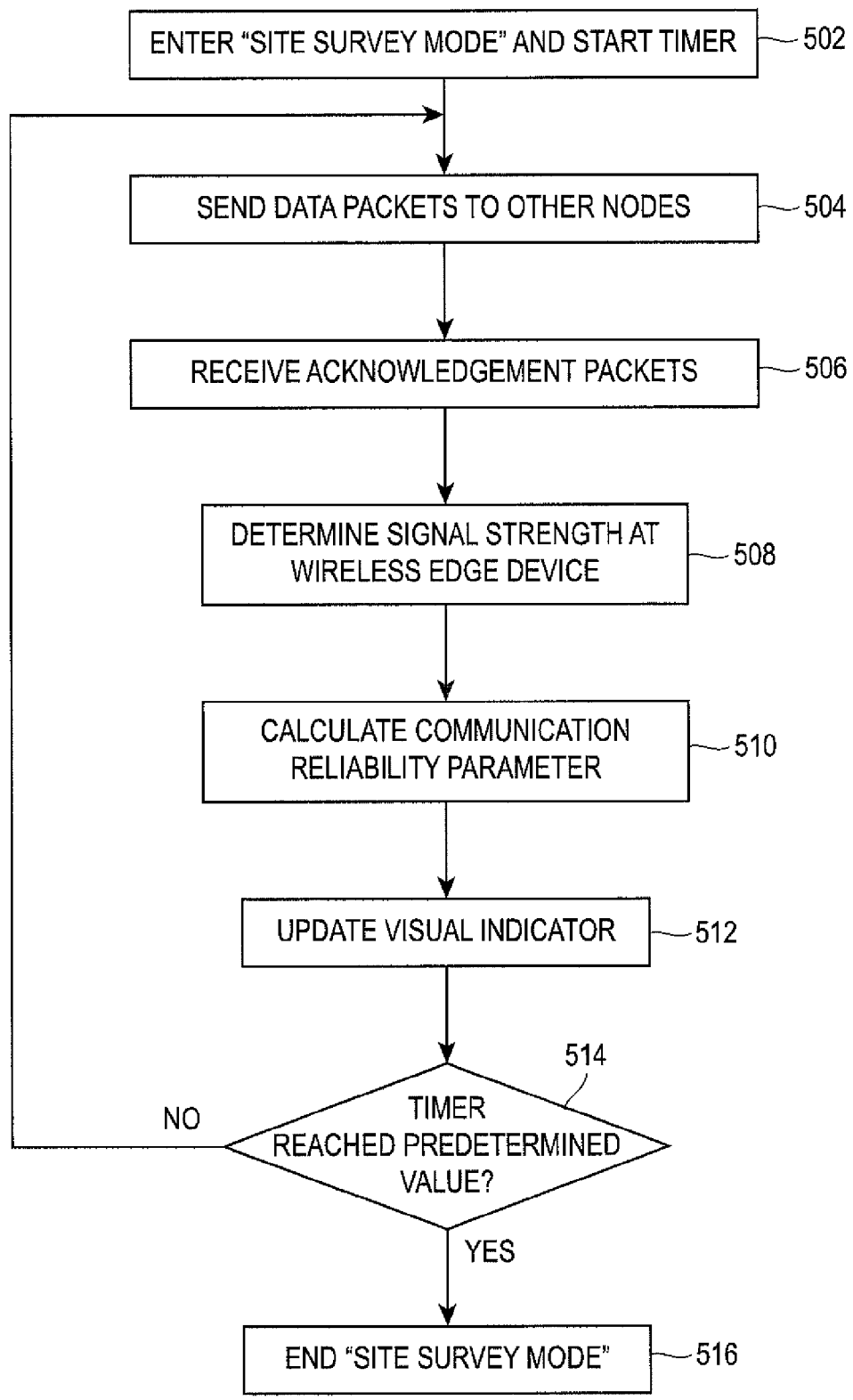
FIG. 5 is a flow chart illustrating an example of a method of providing a visual indicator of signal strength of wireless devices.

Referring now to FIG. 5, an example of a process 500 implemented by a wireless edge device 108(a) for providing a visual indicator of signal strength of wireless devices is illustrated and described. The process 500 of providing a visual indicator begins at step 502 when the wireless edge device 108(a), operating in a lower power consumption normal operation mode, receives a signal from a user that activates a mode of operation of the wireless edge device 108(a) referred to as "site survey" mode. The site survey mode enables the visual indicator 110 to show in near real-time the reliability of the communication of the wireless edge device 108(a) to one or more nodes. At step 502, the wireless edge device 108(a) also starts a timer, which is set to a predetermined value to prevent unnecessary power usage. The user may activate the site survey mode by interacting with a graphical interface 150 or by physically interacting with the wireless edge device 108(a). For example, the physical interaction may entail pushing a button on or other physical interaction with the wireless edge device 108, which may include blocking light to a transducer, temperature, or initiating capacitance change through touch. The graphical interface 150 may include a software interface where a user can direct the wireless edge device 108(a) to enter (or exit) the site survey mode. The user interaction with the software interface 150 initiates delivery of a command that will adjust the operation mode. The command can be sent from a node such as, for example, the base station 106 or another wireless edge device 108(b) to the wireless edge device 108(a), or node, that is to enter (or exit) the site survey mode. Control proceeds to step 504.

In step 504, upon receiving the command to enter site survey mode, wireless edge device 108 will send data packets periodically or asynchronously to other nodes, such as, for example, the base station 106 and/or another wireless edge device 108(b), and monitor the communication integrity. Nodes that receive the packets will respond by sending acknowledgement packets back to the wireless edge device 108(a) that originated the communication. Control proceeds to step 506.

In step 506, the original node, that is, wireless edge device 108(a), receives the acknowledgement packets and, in step 508, the wireless edge device 108(a) determines signal strength at the wireless edge device 108(a) based on the incoming packets. According to one aspect, the wireless edge device 108(a) evaluates the strength of an incoming RF signal using the common wireless signal metric know as Receive Signal Strength Indicator (RSSI) which is a parameter typically provided by a wireless radio. According to another aspect, the wireless edge device 108(a) evaluates signal strength directly by monitoring the success rate of packets sent from the node (i.e., the wireless edge device 108(a)) to the data aggregation point; i.e., the base station 106. The wireless edge device 108(a) can monitor the success rate of packets sent as the aggregation point is configured to respond to successful packet transmission with an acknowledgement packet. Upon the wireless edge device 108(a) receiving the acknowledgement packet, the success of the original packet sent to the aggregator is known by the wireless edge device 108(a). The successful and unsuccessful transmission of packets to and from the data aggregation point can then be tracked over time to determine a packet success rate. According to various aspects, the signal strength can for example be determined as the ratio of the time that communication is sustain relative to the time that packets are lost in transmission. In some aspects, a similar ratio can be computed based on the number of successfully transmitted packets relative to the total number or expected packet transmissions. In some aspects, signal strength can be evaluated based on the time that the RSSI is above a threshold relative to the time that the RSSI is below the threshold. Control then proceeds to step 510.

In step 510, the wireless edge device 108(a) calculates a communication reliability parameter based on mathematical manipulation of the signal strength. For example, a running average with a buffer of 1 or greater can be used in certain cases to smooth or stabilize the signal strength. Other mathematical processing may include computing an RMS value as the communication reliability parameter. Control then proceeds to step 512, where the wireless edge device 108(a) updates the visual indicator 110 to reflect the computed communication reliability parameter. Control continues to step 514.

In step 514, the wireless edge device 108(a) determines whether the timer has reached the predetermined value. If the timer has not reached the predetermined value in step 514, control returns to step 504. If the timer has reached the predetermined value in step 514, control proceeds to step 516 where the site survey mode ends. Additionally, the node (i.e., wireless edge device 108(a)) may exit site survey mode by the user interfacing with the software interface or physically with the wireless edge device 108(a) in a similar way to what was performed when the node entered site survey mode at step 502. To prevent the node from staying in site survey if communication is completely lost, a timer corresponding to the duration of time that the node has continuously been in site survey mode, may expire which will trigger the initiation of a command that will cause the node to exit site survey mode and return to the lower power consumption normal operation mode.

This disclosure addresses the problem of arranging a wireless network of notes by enabling the user controlling the position of the node to evaluate the wireless signal quality in real-time while moving in a facility. The disclosure is related to a method of using a visual indicator, includes LEDs, to show the near real-time status of the communication link at a node. The LED characteristics may include flash rate, duty cycle, brightness, color, or any combination of these characteristics. The visual indicator can manipulate these characteristics to indicate signal quality and/or a change in signal quality.

Implementations according to the disclosure offer this real-time visual indication in a way that does not compromise the battery life of a low power node, or wireless edge device. A low power wireless edge device typically has a limited energy reservoir device or battery. Operating a high efficiency LED or other visual indicators can consume tens of milliamps, but for low power edge devices, the typical average power budget is two orders of magnitude lower than that of such an LED. However, the wireless network of the disclosure addresses this problem by providing the wireless edge device with a time-limited site survey mode to support a signal strength indication function apart from a normal low-power operation mode. The site survey mode can be used at certain times when a wireless network is to be setup. Thus, the wireless edge device can typically be in a dormant state and wake for just a short period of active time.

An exemplary implementation of the wireless sensor network 100 is described and illustrated in co-pending U.S. patent application Ser. No. 14/486,266, entitled "WIRELESS SENSOR NETWORK," filed on Sep. 15, 2014, the disclosure of which is hereby incorporated herein in its entirety.

The disclosed and other examples may be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory, or a random access memory, or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. For example, a communications channel may include the Web, where a user may interact with an interaction site via a webpage generated dynamically according to the interaction flow. As another example, a communications channel may include a smart phone application, where a user may interact with an interaction site by starting a smart phone application, and the smart phone application then contacts the interaction site and provides a communications interface between the user and the interaction site. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless edge device operable in a wireless network and configured to communicate with other wireless devices in the wireless network, the wireless edge device comprising:
   a processor configured to receive an input to switch from a low power consumption normal operation mode to a site survey mode;
   a transceiver configured to (i) transmit data packets periodically or asynchronously to a wireless device of the wireless network, and (ii) receive acknowledgement packets returned by the wireless device, the acknowledgement packets indicating receipt of the data packets by the wireless device; and
   a visual indicator, wherein
   the processor is further configured to:
      evaluate quality and/or reliability of the received acknowledgement packets and provide a signal to the visual indicator indicative of signal strength at the wireless edge device based on the evaluation of quality and/or reliability of the received acknowledgement packets by evaluating signal strength of an incoming radio frequency (RF) signal, including determining an amount of time that the signal strength of an incoming radio frequency (RF) signal is above a threshold relative to an amount of time that the signal strength of the incoming RF signal is below the threshold, and
      switch from the site survey mode to the low power consumption normal operation mode after a predetermined time.

2. The wireless edge device of claim 1, further comprising a sensor.

3. The wireless edge device of claim 2, wherein the sensor is configured to sense vibration, light, temperature, or pressure.

4. The wireless edge device of claim 2, wherein the sensor is an accelerometer, a gyroscope, a magnetometer, a strain gauge, a load cell, a temperature sensor, or a pressure sensor.

5. The wireless edge device of claim 1, wherein the wireless edge device is a control node.

6. The wireless edge device of claim 1, further comprising memory.

7. The wireless edge device of claim 1, wherein the visual indicator includes a light emitting diode.

8. A wireless network, comprising:
   the wireless edge device of claim 1;
   a base station configured to communicate wirelessly with the wireless edge device; and
   a collection server communicably coupled with the base station.

9. The wireless edge device of claim 1, wherein the processor is configured to evaluate quality and/or reliability of the received acknowledgement packets by comparing the sent data packets with the received acknowledgement packets.

10. The wireless edge device of claim 9, wherein the processor is further configured to evaluate quality and/or reliability of the received acknowledgement packets by determining a packet success ratio of a number of received acknowledgement packets to a number of sent data packets over a period of time.

11. The wireless edge device of claim 1, wherein the processor is configured to wirelessly receive the input from a user via the wireless network.

12. A method of visually indicating signal strength at a wireless edge device of a wireless network, the method comprising steps of:
   receiving at the wireless edge device, via a processing unit, an input to switch from a low power consumption normal operation mode to a site survey mode;
   sending, via a transceiver, data packets periodically or asynchronously from the wireless edge device to a wireless device of the wireless network;
   receiving at the wireless edge device, via the transceiver, acknowledgement packets returned by the wireless device, the acknowledgement packets indicating receipt of the data packets by the wireless device;
   evaluating, via the processing unit, quality and/or reliability of the received acknowledgement packets, including evaluating signal strength of an incoming radio frequency (RF) signal by determining an amount of time that the signal strength of the incoming RF signal is above a threshold relative to an amount of time that the signal strength of the incoming RF signal is below the threshold;
   providing a visual indication of signal strength at the wireless edge device based on the evaluation of quality and/or reliability of the received acknowledgement packets; and
   switching, via the processing unit, from the site survey mode to the low power consumption normal operation mode after a predetermined time.

13. The method of claim 12, wherein the step of evaluating comprises comparing the sent data packets with the received acknowledgement packets.

14. The method of claim 13, wherein the step of evaluating further comprises determining a packet success ratio of a number of received acknowledgement packets to a number of sent data packets.

15. The method of claim 14, wherein the step of evaluating further comprises determining the packet success ratio over a period of time.

16. The method of claim 12, wherein the receiving step comprises wirelessly receiving the input from a user via the wireless network.

* * * * *